(12) United States Patent
Fultz et al.

(10) Patent No.: US 8,113,544 B2
(45) Date of Patent: Feb. 14, 2012

(54) ROTATING FLUID UNION

(75) Inventors: Jimmy Fultz, Houston, TX (US); Ryan Gustafson, Houston, TX (US); Jaime Pedraza, Cypress, TX (US)

(73) Assignee: Hydril USA Manufacturing LLC, Houston, TX (US)

( * ) Notice: Subject to any disclaimer, the term of this patent is extended or adjusted under 35 U.S.C. 154(b) by 1252 days.

(21) Appl. No.: 11/400,351

(22) Filed: Apr. 7, 2006

(65) Prior Publication Data
US 2007/0236006 A1 Oct. 11, 2007

(51) Int. Cl.
*F16L 27/00* (2006.01)
(52) U.S. Cl. ......... 285/272; 285/273; 285/275; 285/281
(58) Field of Classification Search ............... 285/121.1, 285/272–273, 275, 278, 280–281; 188/71.4–71.5, 188/166
See application file for complete search history.

(56) References Cited

U.S. PATENT DOCUMENTS

| | | | | |
|---|---|---|---|---|
| 1,936,032 A * | 11/1933 | Ruesenberg | ..................... | 192/70 |
| 2,029,631 A * | 2/1936 | Morgan, Jr. et al. | ............. | 285/15 |
| 2,175,382 A * | 10/1939 | Eason | ........................... | 192/215 |
| 2,914,140 A * | 11/1959 | Werner | ........................ | 188/71.5 |
| 3,253,687 A * | 5/1966 | Young | ........................ | 192/85.42 |
| 3,806,082 A | 4/1974 | Kellner | | |
| 3,887,161 A | 6/1975 | Kubelka, Jr. | | |
| 3,941,348 A | 3/1976 | Mott | | |
| 4,316,596 A | 2/1982 | Krober et al. | | |
| 4,408,685 A * | 10/1983 | Schilling et al. | ............ | 192/85.23 |
| 4,421,171 A | 12/1983 | Haynes | | |
| 4,449,739 A * | 5/1984 | Raether | ........................... | 285/14 |
| 4,456,217 A | 6/1984 | Winegeart et al. | | |
| 4,535,852 A | 8/1985 | Boyadjieff et al. | | |
| 4,549,753 A * | 10/1985 | Nuytten | .......................... | 285/95 |
| 4,650,153 A | 3/1987 | Winegeart | | |
| 4,658,937 A * | 4/1987 | Enomoto | ..................... | 188/71.4 |
| 4,700,924 A | 10/1987 | Nelson et al. | | |
| 4,734,080 A * | 3/1988 | Kronert | ........................... | 464/26 |
| 5,507,467 A | 4/1996 | Mott | | |
| 5,762,315 A | 6/1998 | Eggleston | | |
| 5,853,022 A | 12/1998 | Eggleston et al. | | |
| 5,975,487 A | 11/1999 | Eggleston | | |
| 5,979,864 A | 11/1999 | Eggleston | | |
| 5,979,865 A | 11/1999 | Rabby | | |
| 5,988,205 A | 11/1999 | Eggleston | | |
| 6,000,675 A | 12/1999 | Eggleston | | |
| 6,062,534 A | 5/2000 | Eggleston | | |
| 6,145,635 A * | 11/2000 | White | .......................... | 188/170 |
| 6,170,616 B1 * | 1/2001 | White | .......................... | 188/71.5 |
| 6,253,882 B1 * | 7/2001 | White | .......................... | 188/71.5 |
| 6,405,837 B1 * | 6/2002 | Muramoto | ................... | 188/72.5 |
| 6,772,863 B2 * | 8/2004 | Jessen et al. | ................. | 188/71.5 |
| 6,840,493 B2 | 1/2005 | York et al. | | |
| 2004/0011601 A1 * | 1/2004 | Jakobs et al. | ................ | 188/71.5 |
| 2004/0074707 A1 * | 4/2004 | Jessen et al. | ................ | 188/71.5 |
| 2005/0217862 A1 | 10/2005 | Gustafson et al. | | |

* cited by examiner

*Primary Examiner* — Aaron Dunwoody
*Assistant Examiner* — Fannie Kee
(74) *Attorney, Agent, or Firm* — Potomac Patent Group PLLC

(57) ABSTRACT

A fluid union includes a rotatable member with an axis to rotate about, a non-rotatable member, and an actuating member disposed between the rotatable member and the non-rotatable member. The actuating member is moveable along the axis between an engaged position and a non-engaged position and the actuating member is biased towards the non-rotatable member.

16 Claims, 11 Drawing Sheets

ROTATING FLUID UNION

BACKGROUND OF INVENTION

1. Field of the Invention

The invention relates generally to blowout preventers used in the oilfield industry. Specifically, the invention relates to an improved fluid union to supply fluid to an internal blowout preventer or an internal blowout preventer actuator.

2. Background Art

Well control is an important aspect of oil and gas exploration. When drilling a well, for example, in oil and gas exploration applications, safety devices must be put in place to prevent injury to personnel and damage to equipment resulting from unexpected events associated with the drilling activities.

Drilling wells in oil and gas exploration involves penetrating a variety of subsurface geologic structures, or "layers." Occasionally, a wellbore will penetrate a layer having a formation pressure substantially higher than the pressure maintained in the wellbore. When this occurs, the well is said to have "taken a kick." The pressure increase associated with the kick is generally produced by an influx of formation fluids (which may be a liquid, a gas, or a combination thereof) into the wellbore, The relatively high pressure kick tends to propagate from a point of entry in the wellbore to uphole (from a high pressure region to a low pressure region). If the kick is allowed to reach the surface, drilling fluid, well tools, and other drilling structures may be blown out of the wellbore. These "blowouts" often result in catastrophic destruction of the drilling equipment (including, for example, the drilling rig) and substantial injury or death of rig personnel.

Because of the risk of blowouts, blowout preventers ("BOP") are typically installed at the surface or on the sea floor in deep water drilling arrangements to effectively seal a wellbore until active measures may be taken to control the kick. Blowout preventers may be activated so that kicks may be adequately controlled and circulated out of the system. Just as a kick will propagate up the well, it may also enter the drill string and propagate through the inside of the drill string. To control a kick inside the drill string, a drill string internal blowout preventer ("IBOP"), sometimes called a "kelly valve" or a "kelly cock," is used to seal off the drill string until measures can be taken to control the kick.

An IBOP may be formed from a variety of different types of valves, but a ball valve configuration, as shown in FIG. 1A, is the most standard type. Ball valve type IBOPs typically include a valve ball 101 that is located between two seats 103 and 105 in the middle of a passage. The valve ball 101 has a through hole, and may be rotated between two positions: an "open" position and a "closed" position. In the open position, the through hole of the valve ball will align with the passage of the pipe or drill string (as shown), allowing undisrupted fluid flow. In the closed position, the through hole of the valve ball is misaligned with the passage of the pipe or drill string, disrupting fluid flow. In the closed position, the valve ball is able to isolate a kick inside the drill string by containing the upcoming pressure. The valve ball is rotated between the open and closed positions by a rotation device 107 on the side of the IBOP. For reasons of speed and location of the IBOP, the rotation device 107 is typically controlled by an IBOP actuator, as shown in FIG. 1B.

Because an IBOP and its actuator are connected in line with the drill string, they will rotate with the drill string during drilling operations. The IBOP actuator typically is hydraulically or pneumatically powered. A fluid source, such as a pressurized cylinder of liquid or gas, is used to power the IBOP actuator. The fluid source, however, is usually stationary and does not rotate with the IBOP, IBOP actuator, or the drill string. A problem is then presented to supply fluid from the stationary fluid source environment to the rotating IBOP actuator environment. In most applications, drilling is often stopped before actuation of the IBOP, but, for safety reasons, the IBOP and its actuator must be connected to its fluid source at all times and be capable and ready to operate indeterminate of the drill string's rotation.

As shown in FIG. 2A, one prior art IBOP actuator, disclosed in U.S. Pat. No. 4,456,217 issued to Windegeart et al. and incorporated herein by reference, includes a fluid union 270 with a rotating section 274 and a non-rotating section 272 to overcome this problem. A fluid source is routed to the non-rotating section 272 of the fluid union 270 using hydraulic fluid supply lines 214 and 216, in which the non-rotating section 272 is coupled to the rotating section 274 of the fluid union 270 through various seals 290, bearings 280, and passageways 260 and 262 to allow flow of the fluid source from the non-rotating section 272 to the rotating section 274. The rotating section 274 of the fluid union 270 then supplies the fluid source to an actuator 230 to open and close an IBOP to control the flow through a drill string.

An issue with this type of prior art fluid union is that the seals between rotating sections require frequent replacement due to wear. For example, the seals 290 within the fluid union 270 are in constant contact with both the rotating section 274 and the non-rotating section 272 of the fluid union 270, causing the seals 290 to rub against sealing surfaces rotating at high speeds. This contact and rubbing generates heat and makes the seals susceptible to increased wear and degradation, which significantly reduces the service life of the seals. With the addition of contaminates from corrosive drilling fluids, a salt-water environment, extreme ambient temperatures, and heavy vibration, seals and bearings must be replaced with high frequency to ensure reliability and function of the fluid union to actuate the IBOP.

As shown in FIG. 2B, another type of prior art fluid union is disclosed in U.S. Pat. No. 4,700,924 issued to Nelson et al. and incorporated herein by reference. The fluid union includes a rotating section 203 and a non-rotating section 201. The rotating section 203 contains an actuator 231 to open and close an IBOP 241. Deformable sealing rings 205 and 207 are disposed within the non-rotatable member 201 and hydraulic fluid supply lines 209 and 211 supply a fluid source to the non-rotating section 201. When a pressurized fluid source is supplied to the non-rotating section 201 through the supply lines 209 and 211, the sealing rings 205 and 207 move from a relaxed state to an excited state. In the excited state, the deformable sealing rings 205 and 207 form a seal against the rotatable member 203. This allows the pressurized fluid source from the supply lines 209 and 211 to flow through sealed passages from the non-rotating member 201 into the rotating member 203.

One potential issue of this type of prior art fluid union is that the deformable sealing rings must radially contract when sealing against the rotating section of the fluid union. With multiple sequences of contracting and expanding of the sealing rings between their excited and relaxed states, the sealing rings may then experience wear, cracks, or even permanent deformation, limiting the ability of the sealing rings to provide a seal.

Further, another issue with prior art fluid unions in general is that they are not readily accessible when maintenance is required. The fluid unions are typically complete circular designs which fully encompass the drill string. The design requires the fluid union to slide over an end of the drill string for installation or repair. Depending on the complexity of the fluid union and actuator design, many valuable hours may be lost for repairs and maintenance because of the inaccessibility of the fluid union.

DETAILED DESCRIPTION

In one aspect, the present invention provides an improved fluid union. More specifically, select embodiments of the present invention provide a fluid union that uses an axially moveable actuating member to selectively seal between a rotating and a non-rotating member of the fluid union.

Figure 10:
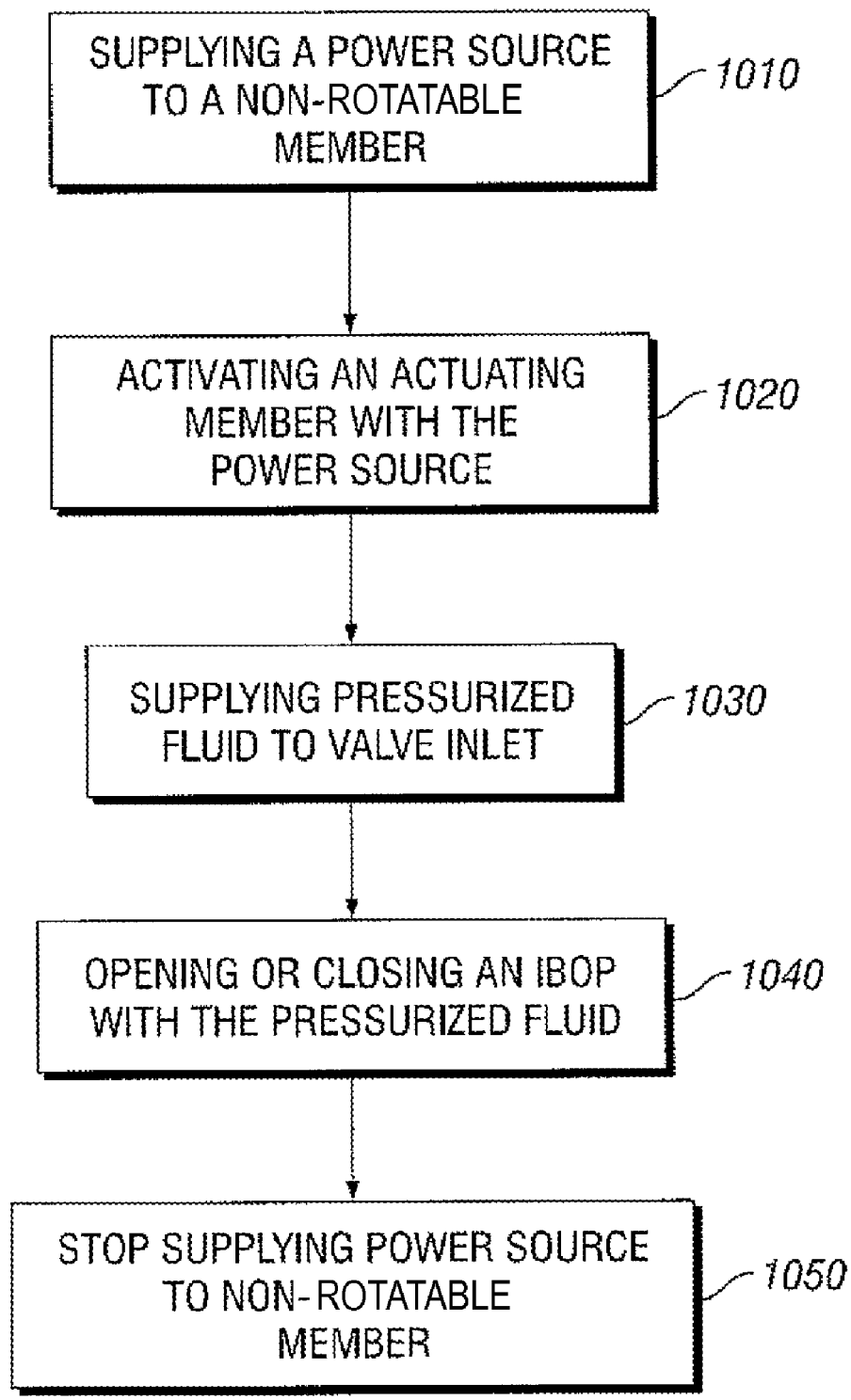
FIG. 10 shows a flow chart of a method of actuating an internal blowout preventer in accordance with an embodiment of the present invention.

FIG. 10 shows a flow chart of a method of actuating an IBOP in accordance with an embodiment of the present invention. As a first step 1010, a power source is supplied to a non-rotatable member of a fluid union. The fluid union includes a non-rotatable member and a rotatable member disposed about an axis that are rotatably secured to one another, allowing the members to rotate with respect to one another about the axis. The power source, such as hydraulic, pneumatic, or electric power, usually will come from a stationary environment relative to the non-rotating member. Next, as a second step 1020, the power source activates an "actuating" member disposed between the non-rotatable member and the rotatable member of the fluid union to move from a "non-engaged" position into "an engaged" position. As used herein, an actuating member refers to a member that uses the power source for activation or motion, such as a piston uses pressure (hydraulic power) for activation. The actuating member is initially biased by a biasing mechanism into the non-engaged position. The power source then moves the actuating member along the axis of the fluid union into the engaged position. In the engaged position, the actuating member is enabled by the power source to form at least one sealed passageway between the non-rotatable member and rotatable member of the fluid union. The power source may then be continuously supplied to the activation inlet throughout the fluid union's use to maintain the at least one sealed passageway between the members of the fluid union.

As a third step 1030, pressurized fluid from a fluid source is supplied to at least one valve inlet of the non-rotatable member of the fluid union. The pressurized fluid supplied to the at least one valve inlet flows through the at least one sealed passageway formed in step 1020 to flow from the non-rotatable member to the rotatable member of the fluid union. The rotatable member of the fluid union may also be secured to an IBOP or IBOP actuator. The at least one sealed passageway between the non-rotatable member and the rotatable member of the fluid union then extends into the secured IBOP or IBOP actuator. This enables the pressurized fluid from the at least one valve inlet to flow through the at least one sealed passageway all the way into the secured IBOP or IBOP actuator. As a fourth step 1040, the pressurized fluid from step 1030 may then be used by the secured IBOP or IBOP actuator to open and close the IBOP as necessary. The pressurized fluid supplied to the at least one valve inlet opens and closes the IBOP to disrupt fluid flow through the drill string. As a final step 1050, after pressurized fluid is no longer supplied to the valve inlets to actuate the IBOP or IBOP actuator, the power source may stop being supplied to the activation inlet. This allows the actuating member to move from the engaged position back into the non-engaged position.

Figure 1A:
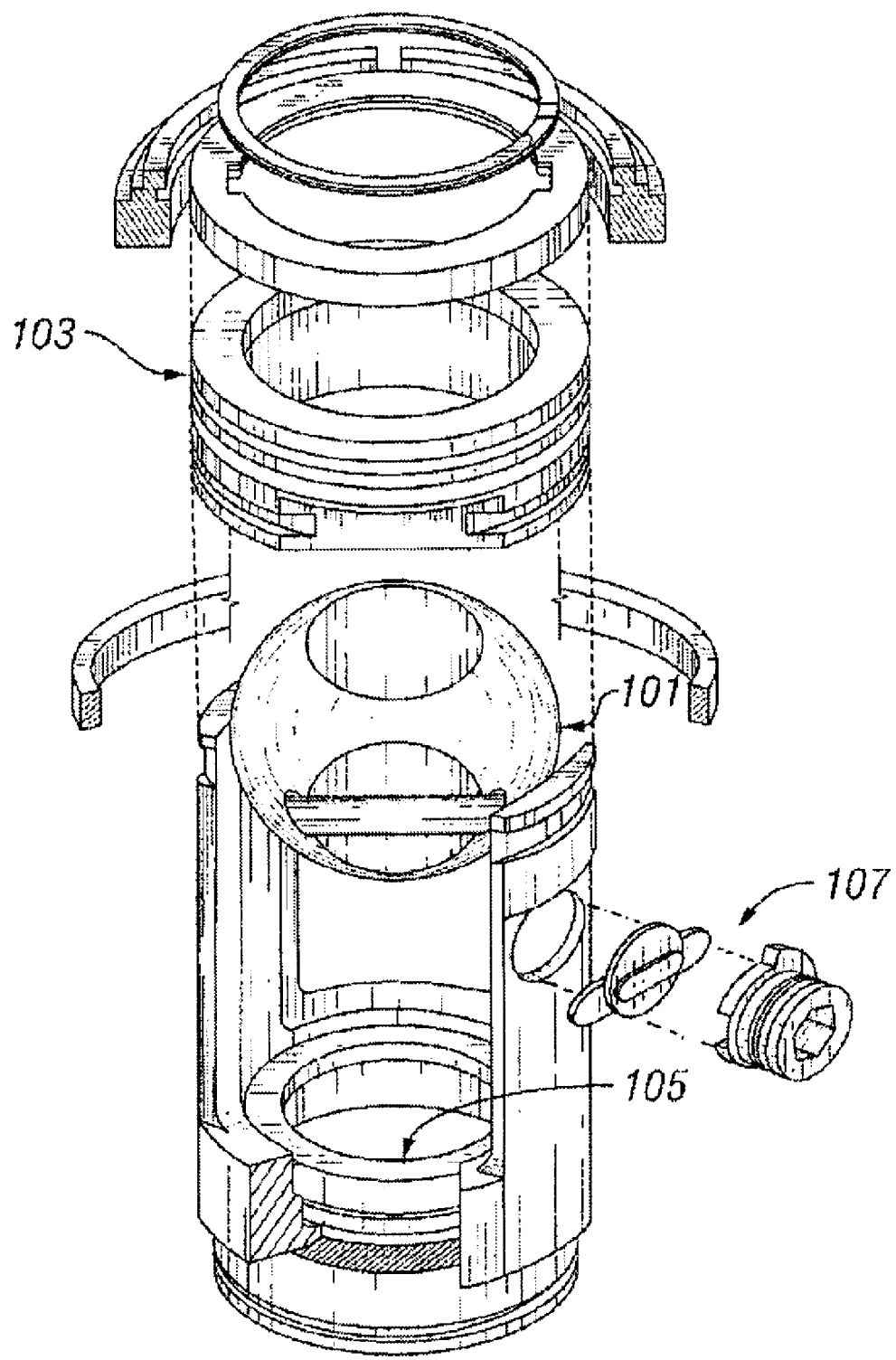
FIG. 1A shows an exploded view of a prior art internal blowout preventer.
Figure 1B:
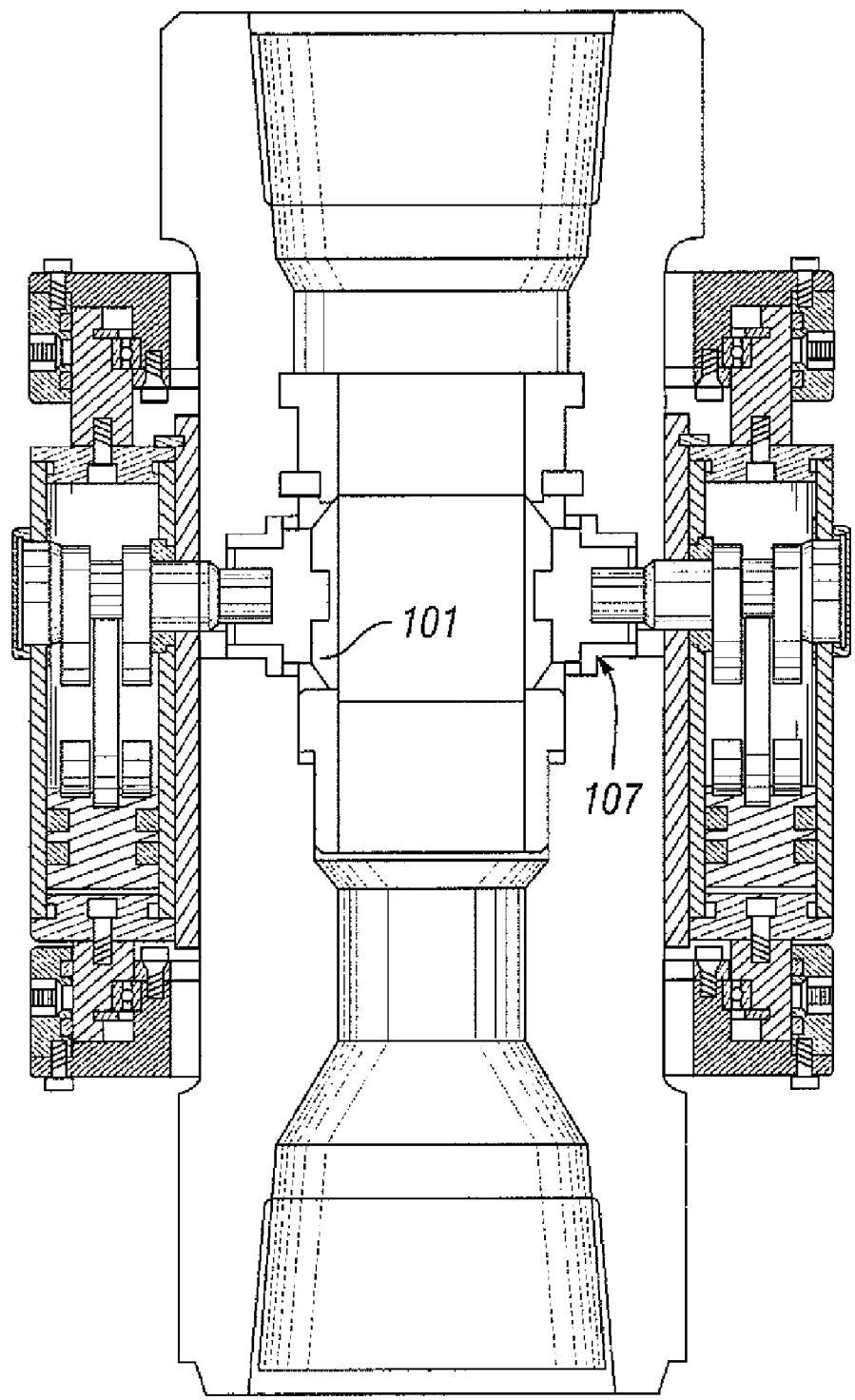
FIG. 1B shows a cross-sectional view of a prior art internal blowout preventer actuator.
Figure 2A:
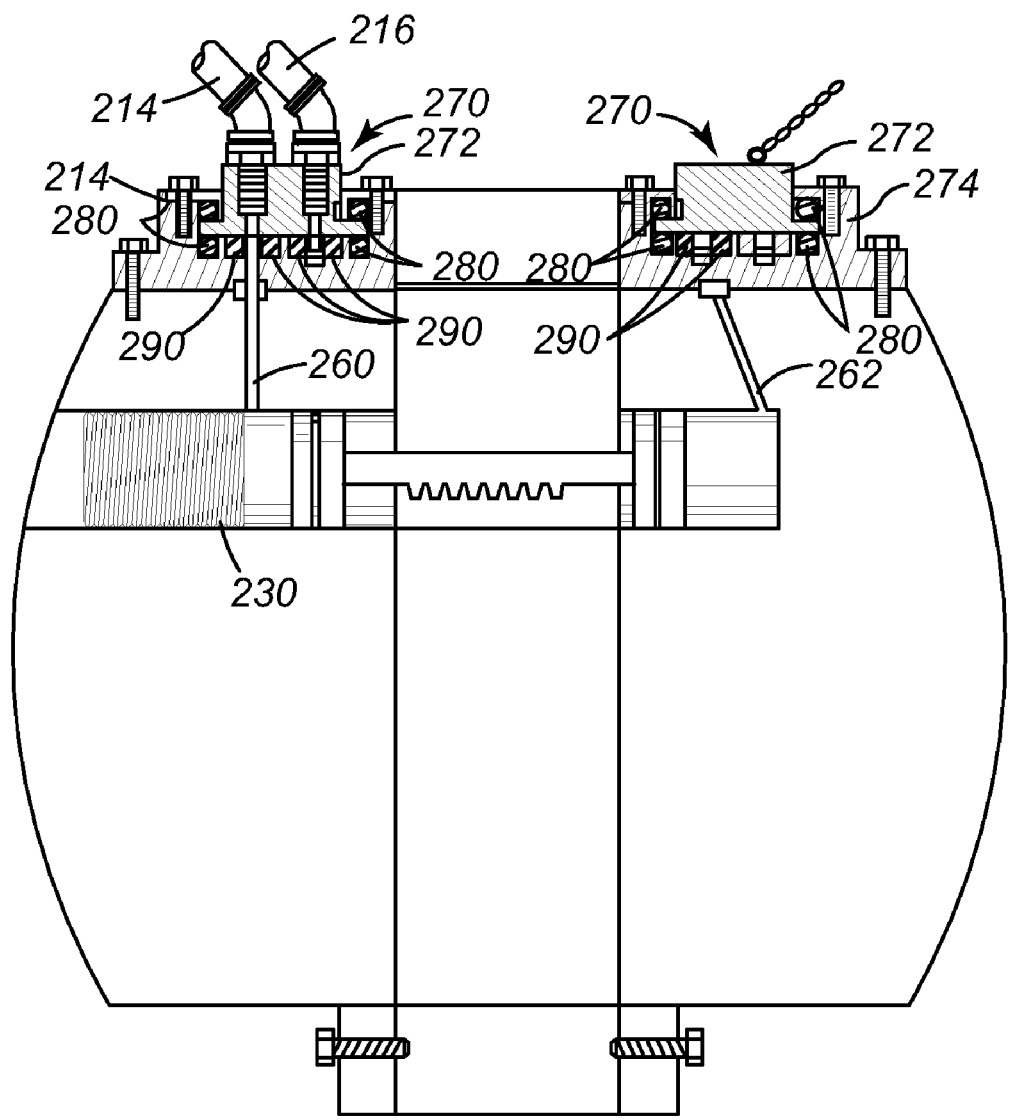
FIG. 2A shows a cross-sectional view of a prior art fluid union.
Figure 2B:
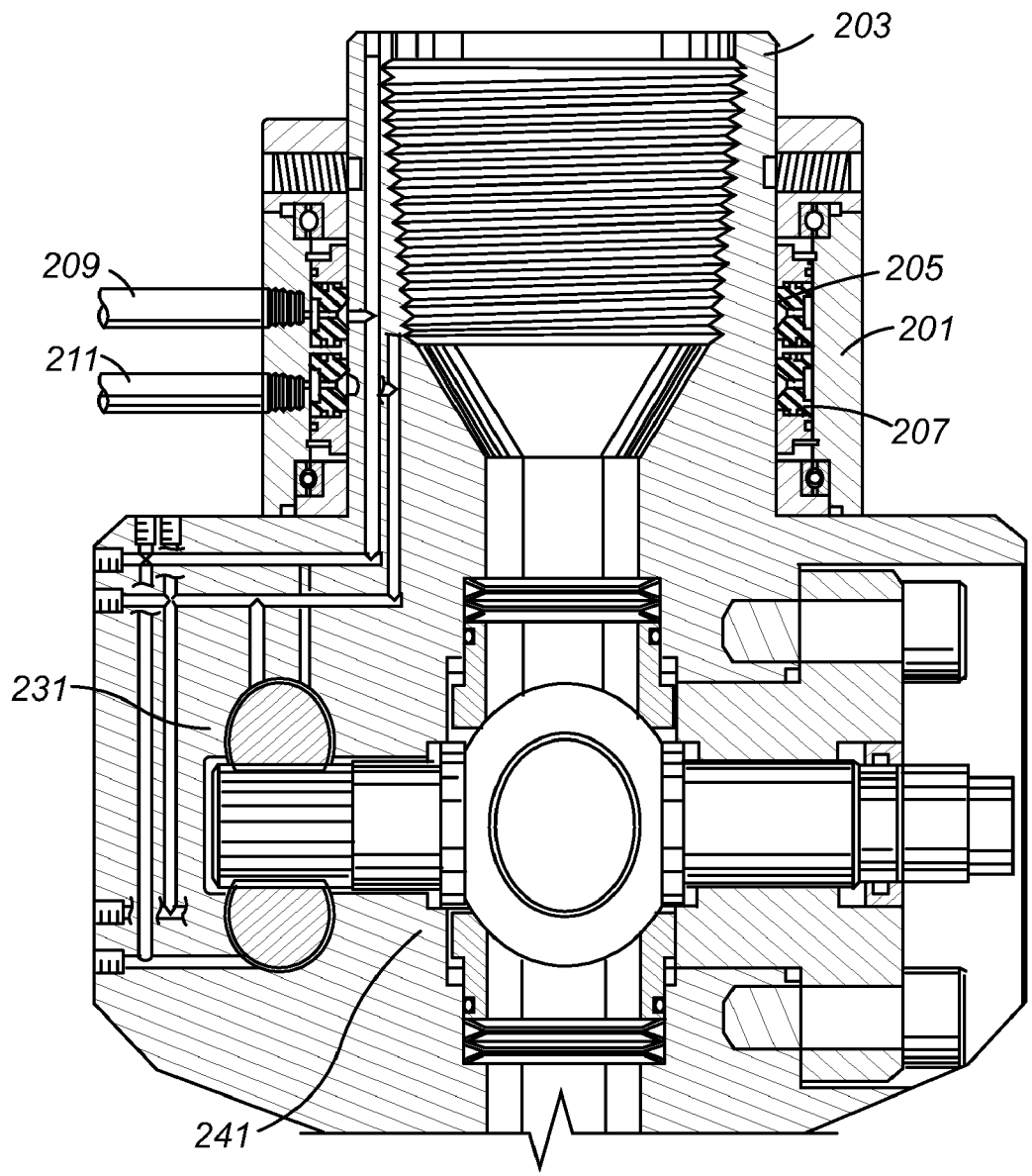
FIG. 2B shows a cross-sectional view of a prior art fluid union.
Figure 3A:
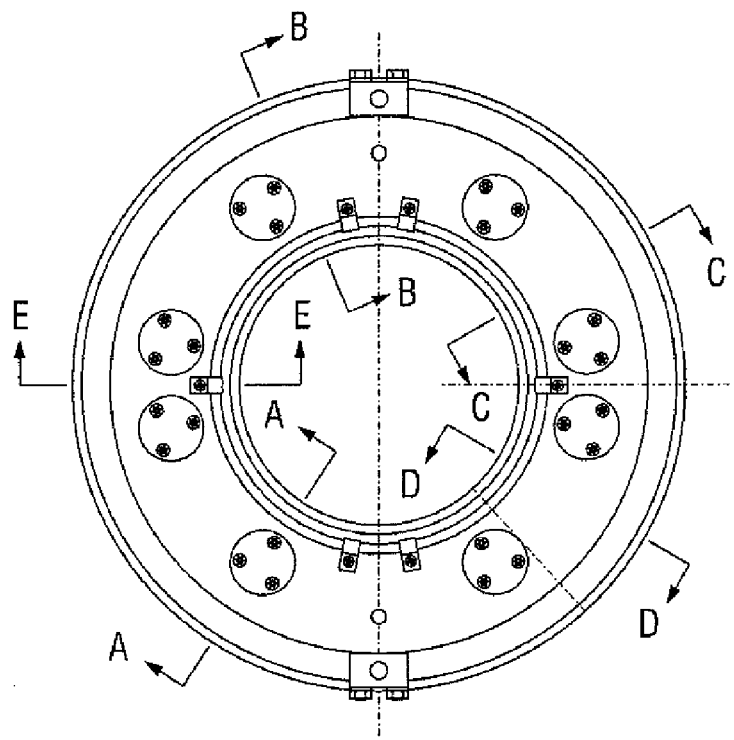
FIG. 3A shows an above view of a fluid union in accordance with an embodiment of the present invention.
Figure 3B:
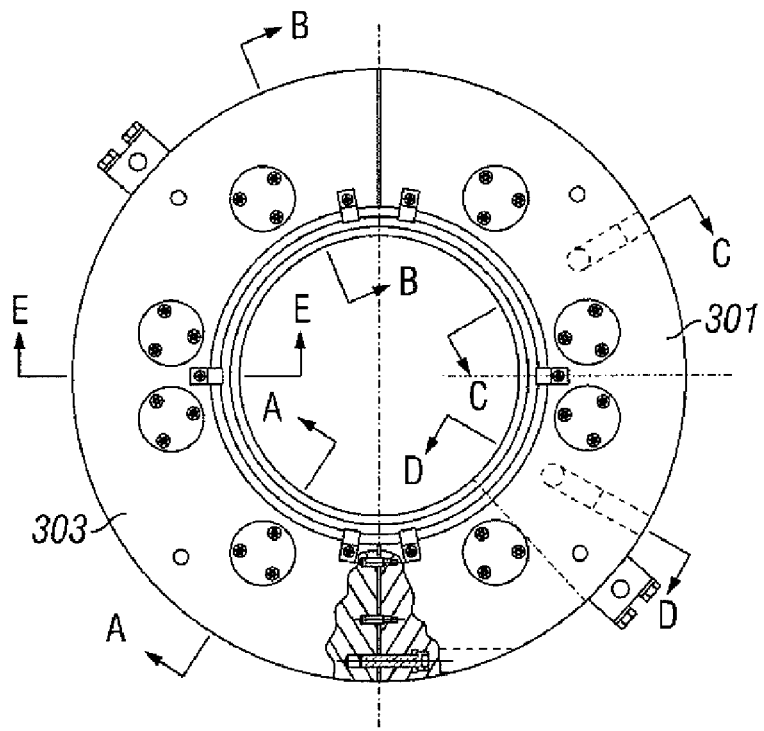
FIG. 3B shows an above view of a fluid union in accordance with an embodiment of the present invention.

FIGS. 3A and 3B show a fluid union in accordance with an embodiment of the present invention. In the embodiment shown in FIG. 3A, the fluid union is non-split. As used herein, "non-split" refers to the fluid union being a complete ring with no divisions. In the embodiment shown in FIG. 3B, the fluid union is split. The split fluid union embodiment in FIG. 3B is shown with two halves 301 and 303, in which the halves 301 and 303 may be connected with a securing pin and a gasket to provide a seal between the halves 301 and 303. Those having ordinary skill in the art will appreciate that the fluid union may further be split into more than two sections.

Figure 4A:
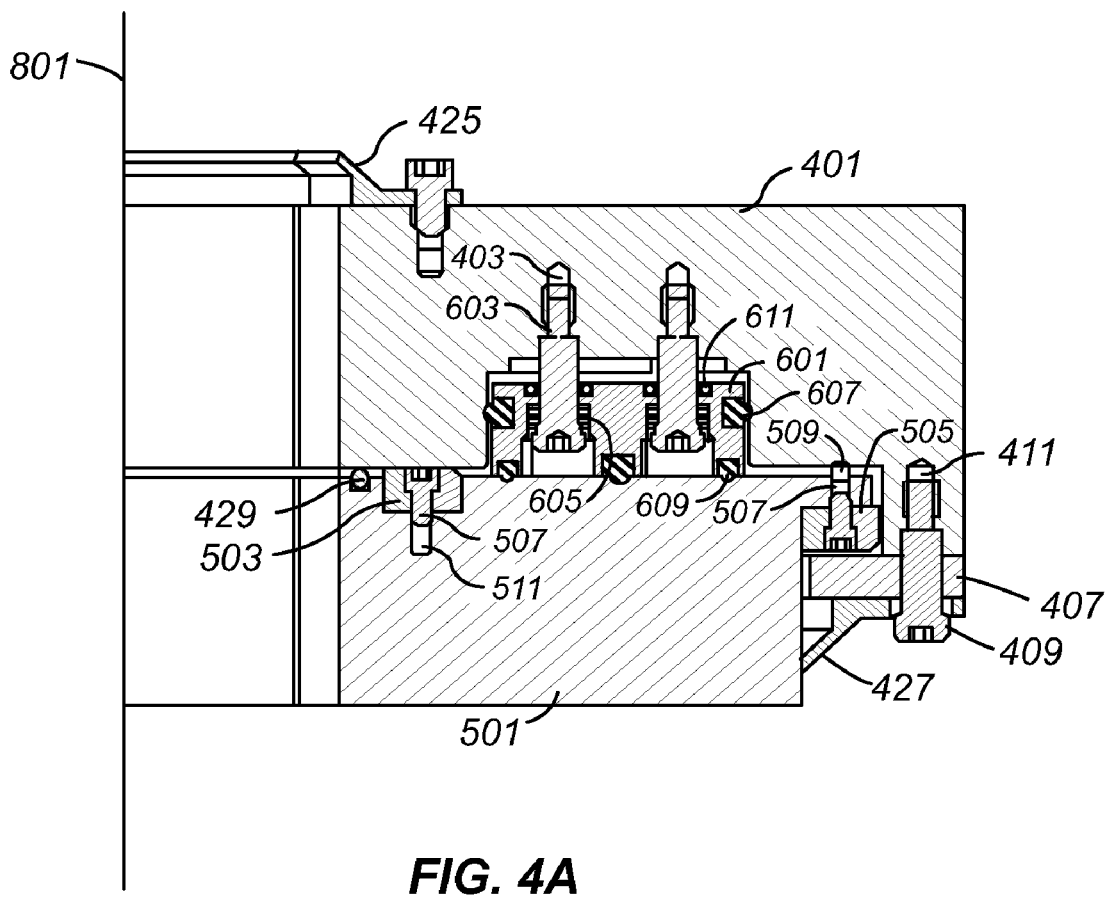
FIG. 4A shows a cross-section taken along line A-A of the fluid union shown in FIGS. 3A and 3B in accordance with an embodiment of the present invention.

FIG. 4A shows a cross-section taken along line A-A of the fluid union shown in FIGS. 3A and 3B. The fluid union includes a non-rotatable member 401 and a rotatable member 501 disposed about an axis 801. The non-rotatable member 401, which may be the upper member of the fluid union as shown, remains rotationally stationary with respect to a drilling rig (not shown) to receive power from a stationary source (also not shown). The rotatable member 501, which may be the lower member of the fluid union as shown, is capable of rotating with respect to the non-rotatable member 401 about the axis 801. The rotatable member 501 may attach to a lower IBOP or IBOP actuator (not shown), which rotates with the drill string. Those having ordinary skill in the art will appreciate that in other embodiments of the present invention, the non-rotatable member may instead be the lower member of the fluid union and the rotatable member may be the upper member of the fluid union.

The fluid union further includes an actuating member 601 located between the non-rotatable member 401 and the rotatable member 501. In this embodiment, the actuating member 601 is a piston disposed within the non-rotatable member 401 of the fluid union and is attached to the non-rotatable member 401. The piston may then be a disk actuating member comprised of a metal. As shown in FIG. 4A, the piston may be attached to the non-rotatable member 401 with two pins 603. The pins 603 may threadedly engage with recesses 403 of the non-rotatable member 401. Those having ordinary skill in the art will appreciate that other actuating members may be used without departing from the scope of the present invention. Further, those having ordinary skill in the art will appreciate that the actuating member may be attached to the non-rotatable member by other means than the pins without departing from the scope of the present invention.

Figure 5A:
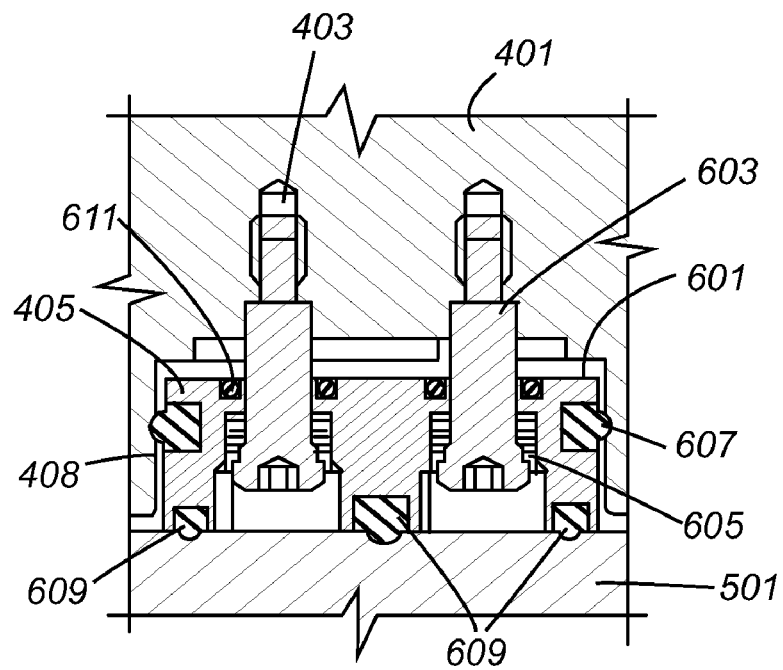
FIG. 5A shows an enlarged view of the fluid union shown in FIG. 4A in accordance with an embodiment of the present invention.
Figure 5B:
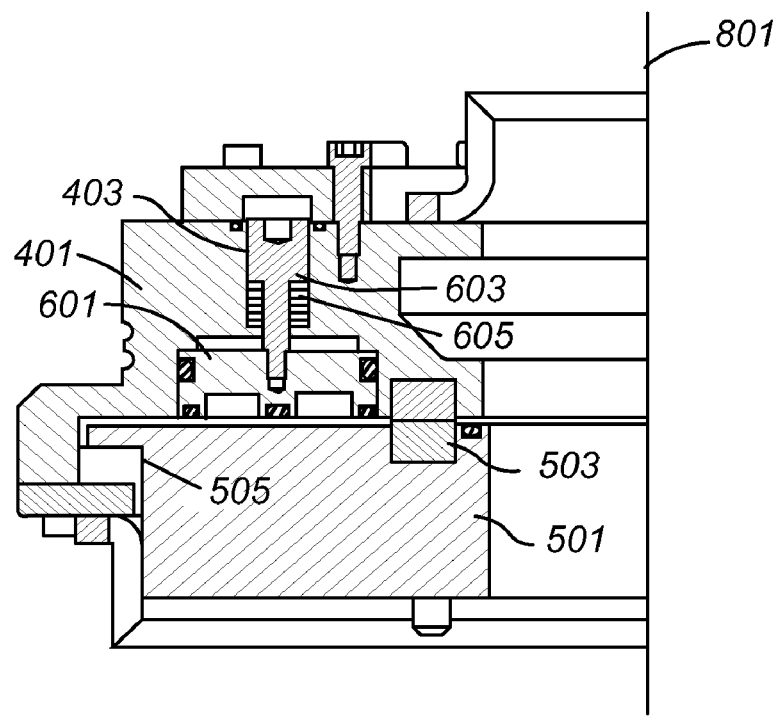
FIG. 5B shows a cross-section of a fluid union in accordance with an embodiment of the present invention.

Using a biasing mechanism 605, the actuating member 601 is biased towards the non-rotatable member 401. In the embodiment shown in FIG. 4A, the biasing mechanism 605 is helical springs disposed within the piston about the pins 603. FIG. 5A shows an enlarged view of the piston shown in FIG. 4A. The helical springs may be in a partially-compressed state between the piston and the head of the pins 603. The piston then comes to rest against shoulders 405 of the non-rotatable member 401. In another embodiment, as shown in FIG. 5B, the biasing mechanism 605 may be Bellville washers disposed within the non-rotatable member 401 about the pins 603, Regardless, in both embodiments of FIGS. 5A and 5B, the biasing mechanism 605 may be disposed in the actuating member 601 or in the non-rotating member 401 to impart a biasing force, which results in biasing the actuating member 601 towards the non-rotatable member 401. The actuating member 601 then has the ability to move up and down between the non-engaged position and the engaged position along the axis 801. In the non-engaged position, as shown, the actuating member 601 may rest against the non-rotatable member 401. In the engaged position, the actuating member 601 may be pushed by the force of the biasing mechanism 605 to rest against the top of the rotatable member 501 to provide sealing contact between the actuating member 601 and the rotatable member 501. Those having ordinary skill in the art will appreciate that other biasing mechanisms, such as Bellville washers, wave springs, and elastomeric material, may be used instead of a helical spring without departing from the scope of the present invention.

Figure 5C:
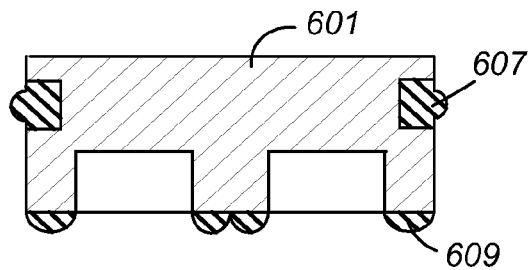
FIG. 5C shows an actuating member in accordance with an embodiment of the present invention.
Figure 5D:
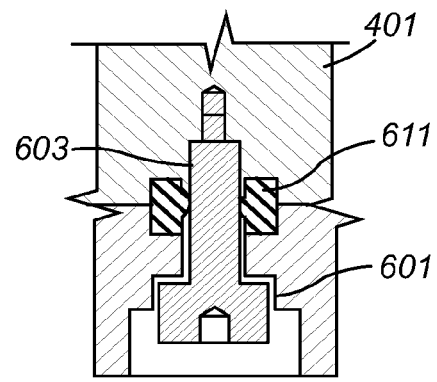
FIG. 5D shows a pin seal in accordance with an embodiment of the present invention.
Figure 5E:
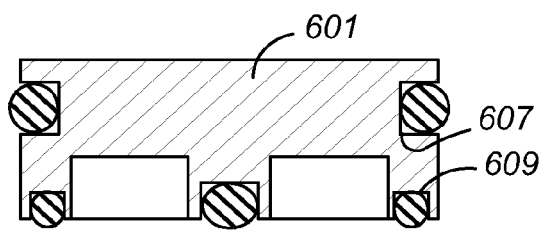
FIG. 5E shows an actuating member in accordance with an embodiment of the present invention.
Figure 5F:
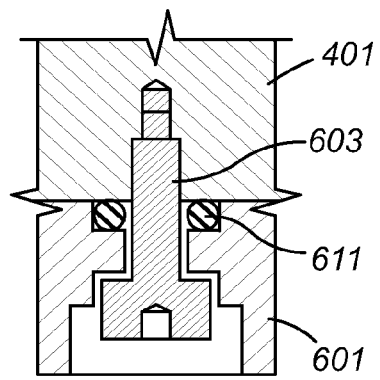
FIG. 5F shows a pin seal in accordance with an embodiment of the present invention.

The actuating member 601 further includes multiple seals disposed thereon. In this embodiment, the actuating member 601 (the piston) includes radial seals 607, face seals 609, and pin seals 611. The radial seals 607 are able to provide sealing contact between the piston and inner side walls 408 of the non-rotatable member 401. The pin seals 611 are able to provide sealing contact between the pins 603 and the piston. Then, when the piston is in the engaged position, the face seals 609 are able to provide sealing contact between the piston and the rotatable member 501. In one embodiment, as shown in FIGS. 5C and 5D, the seals 607, 609, and 611 on the actuating member 601 may comprise molded rubber (rubber molded onto the piston). However, in another embodiment, as shown in FIGS. 5E and 5F, the seals 607, 609, and 611 on the actuating member 601 may comprise o-rings disposed in recesses in the actuating member 601. Those having ordinary skill in the art will appreciate that other embodiments, such as a combination of o-rings and molded rubber, may be used for the seals on the actuating member without departing from the scope of the present invention. Further, those having ordinary skill in the art will appreciate that other seals or combinations of seals, instead of the radial seals, face seals, and pin seals, may be used without departing from the scope of the present invention.

Figure 4B:
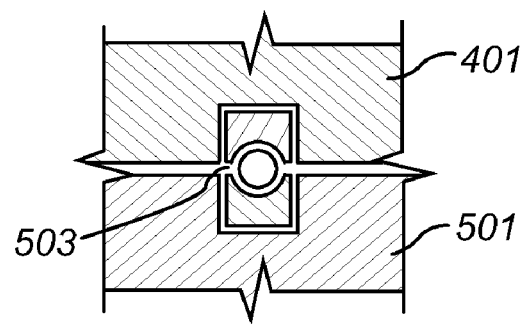
FIG. 4B shows a view of a thrust bearing in accordance with an embodiment of the present invention.

Referring back to FIG. 4A, an axial thrust bearing 503 and a radial bearing 505 may be used to facilitate the relative rotation between the two members 401 and 501. The axial thrust bearing 503 helps prevent the non-rotatable member 401 from moving in the axial direction with respect to the rotatable member 501. The radial bearing 505 helps prevent the non-rotatable member 401 from moving in the radial direction with respect to the rotatable member 501. In one embodiment, as shown in FIG. 4A, the bearings 503 and 505 may comprise high durometer plastic. The high durometer plastic may be held in place in the rotatable member 501 with screws 507 to allow the non-rotatable member 401 to slide against the thrust bearings 503 and 505 when in contact. The screws 507 may then threadedly engage with recesses 509 and 511 of the rotatable member 501. In another embodiment, the bearings 503 and 505 may comprise roller bearings, such as ball bearings, as shown in FIG. 4B. If the bearings 503 and 505 are ball bearings, the ball bearings may be placed in recesses between the non-rotatable member 401 and the rotatable member 501. Those having ordinary skill in the art will appreciate that other bearings may be used without departing from the scope of the present invention.

Still referring to FIG. 4A, the fluid union may further include a retainer bearing 407. The retainer bearing 407 may be secured to the non-rotatable member 401 with screws 409. The screws 409 threadedly engage with recesses 411 of the non-rotatable member 401. The retainer bearing 407 is used to rotatably secure the non-rotatable member 401 to the rotatable member 501, which allows the members 401 and 501 to rotate with respect to one another. The retainer bearing 407 may overhang from the bottom of the non-rotatable member 401 over an edge of the rotatable member 501, the edge where the radial bearing 505 is located. This allows the retainer bearing 407 to axially retain the rotatable member 501 with the non-rotatable member 401, but allow relative rotation between the two members 401 and 501. Those having ordinary skill in the art will appreciate that other securing mechanisms may be used to rotatably secure the rotatable member with the non-rotatable without departing from the scope of the present invention.

As also shown in FIG. 4A, the fluid union may further include seals and wipers to prevent mud, oil, fluid, contaminates, or various other unwanted substances from entering the fluid union. An upper wiper seal 425 may be positioned on top of the non-rotatable member 401 to provide sealing contact against a drill string or a Kelly (not shown). A lower wiper seal 427 may be positioned on the outside bottom of the non-rotatable member 401 to provide sealing contact against the rotatable member 501. The upper and lower wiper seals 425 and 427 may be comprised of plastic or rubber. Further, an inner seal 429 may be positioned radially inside the fluid union between the non-rotatable member 401 and the rotatable member 501 to provide a secondary seal to the upper wiper seal 425.

Figure 6:
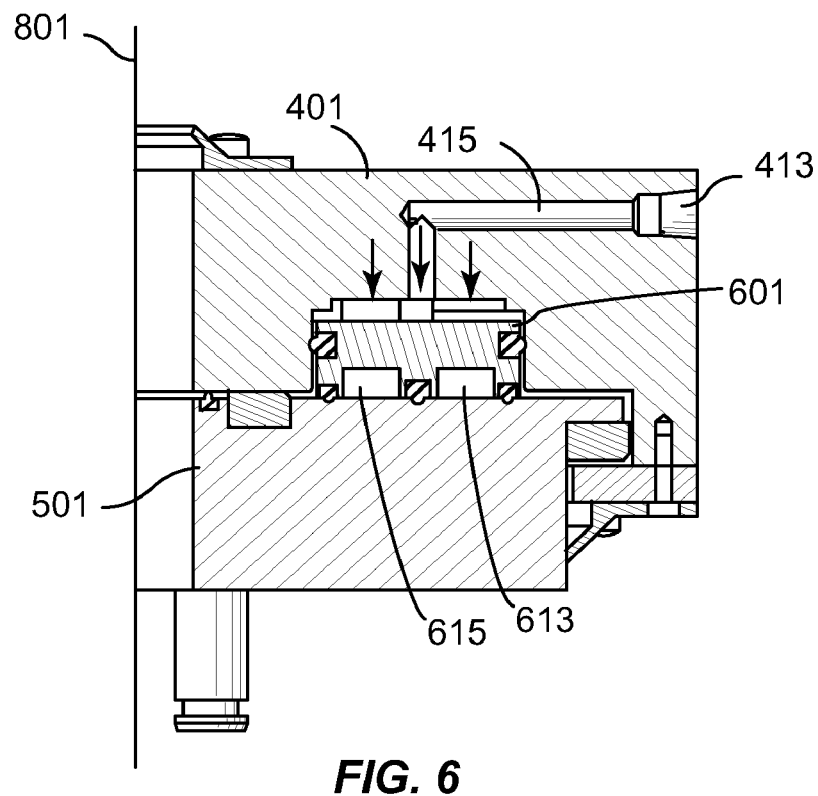
FIG. 6 shows a cross-section taken along line B-B of the fluid union shown in FIGS. 3A and 3B in accordance with an embodiment of the present invention.

FIG. 6 shows a cross-section taken along line B-B of the fluid union shown in FIGS. 3A and 3B. As shown, in one embodiment, the non-rotatable member 401 may have an activation inlet 413, which is used to activate the actuating member 601. Power, such as pressurized fluid for hydraulic power, may then be supplied to the activation inlet 413. The pressurized fluid would be able to apply pressure to the actuating member 601 thru a port 415 extending from the activation inlet 413. When the pressure from the pressurized fluid is large enough, the pressure acting upon the actuating member 601 will translate enough force to overcome the resistant force of the biasing mechanism 605 (not shown here) within the actuating member 601. When this resistant force of the biasing mechanism 605 is overcome by the pressurized fluid, the actuating member 601 will then move along the axis 801 from the non-engaged position (not shown here) to the engaged position. As mentioned above, when the actuating member 601 is then in the engaged position, the face seals 609 will provide sealing contact between the actuating member 601 and the rotatable member 501. The face seals 609 seal against the rotatable member 501 to create two sealed fluid chambers within the actuating member 601: an "open" chamber 613 and a "closed" chamber 615. These two chambers 613 and 615 may be used to supply fluid from the non-rotatable member 401 to the rotatable member 501 in order to actuate and move the IBOP between an open and closed position. Those having ordinary skill in the art will appreciate that other power sources, such as electrical power, may be used to move the actuating member between the non-engaged and engaged positions. In an embodiment that uses electrical power, an activation inlet in the non-rotatable member may not be necessary. Instead, electricity may be supplied to an electrical actuation device, such as a solenoid, disposed within the non-rotatable member to move the actuating member along the axis between the non-engaged and engaged positions.

Figure 7:
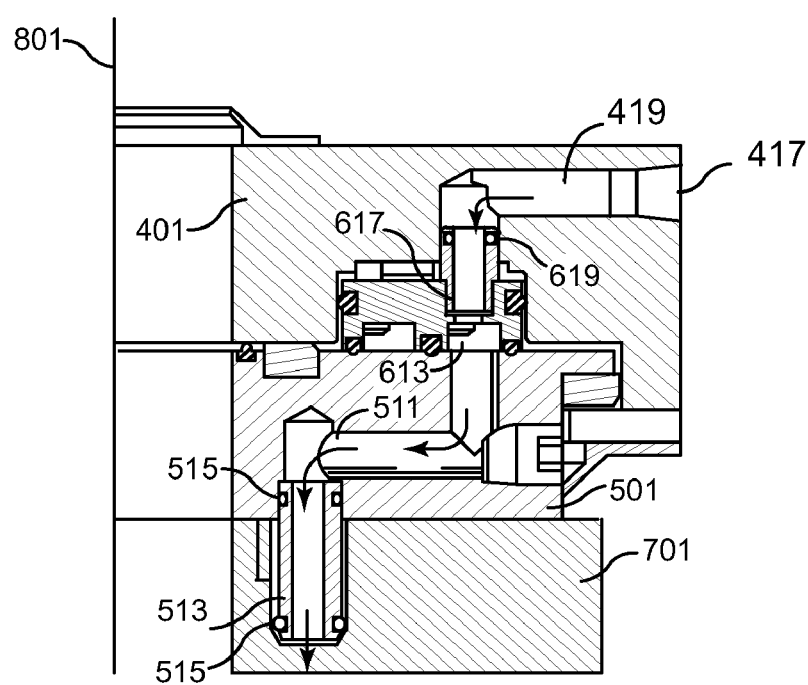
FIG. 7 shows a cross-section taken along line C-C of the fluid union shown in FIGS. 3A and 3B in accordance with an embodiment of the present invention.

FIG. 7 shows a cross-section taken along line C-C of the fluid union shown in FIGS. 3A and 3B. The non-rotatable member 401 further includes an "open" valve inlet 417. The open valve inlet 417 supplies pressurized fluid thru an open valve port 419 to the open chamber 613. The open valve port 419 may be connected to the open chamber 613 by a seal sub 617. The seal sub 617 may be press fit to open chamber 613 of the actuating member 601 and may include a seal 619, as shown, to provide sealing contact between the open valve port 419 and the open chamber 613. Pressurized fluid is then provided from the open chamber 613 to an IBOP or IBOP actuator 701 thru an open valve port 511 in the rotatable member 501. The open valve port 511 may be connected to the IBOP or IBOP actuator 701 by a seal sub 513. The seal sub 513 may include seals 515, as shown, to provide sealing contact between open valve port 511 of the rotatable member 501 and the IBOP or IBOP actuator 701. With this arrangement, when the actuating member 601 is in the engaged position, as shown in FIG. 7, pressurized fluid may be supplied to the open valve inlet 417 of the non-rotatable member 401 of the fluid union to provide pressurized fluid through a sealed passage to the IBOP or IBOP actuator 701. This sealed passage, for example, may be used then by the IBOP or IBOP actuator to open the IBOP and allow fluid flow through the IBOP.

Figure 8:
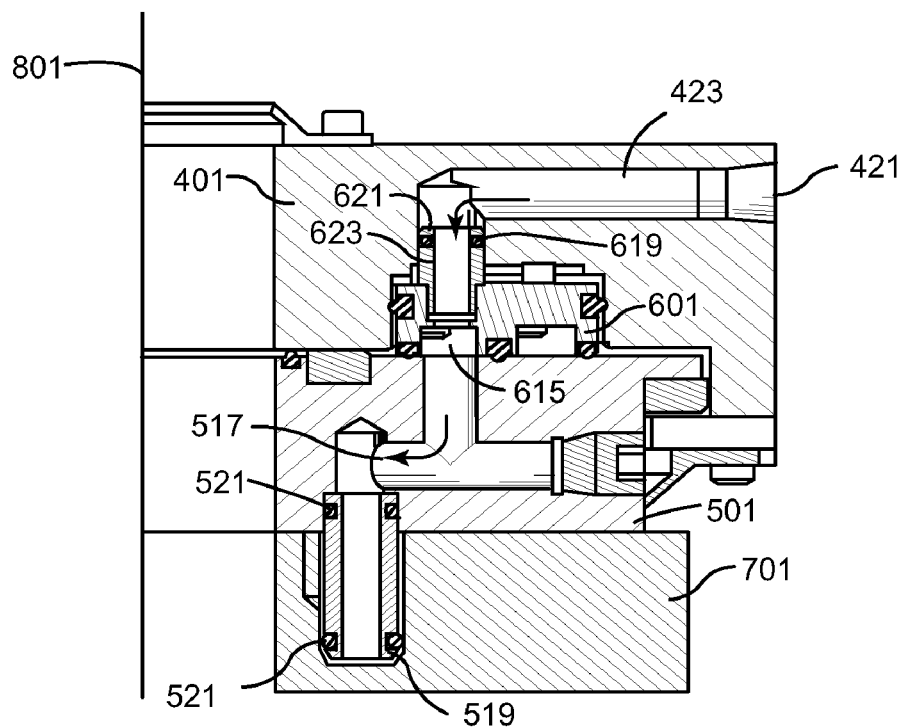
FIG. 8 shows a cross-section taken along line D-D of the fluid union shown in FIGS. 3A and 3B in accordance with an embodiment of the present invention.

FIG. 8, which is similar to FIG. 7, shows a cross-section taken along line D-D of the fluid union shown in FIGS. 3A and 3B. The non-rotatable member 401 includes a "closed" valve inlet 421. The closed valve inlet 421 supplies pressurized fluid thru a closed valve port 423 to the closed chamber 615. The closed valve port 423 may be connected to the closed chamber 615 by a seal sub 621. The seal sub 621 may be press fit to the closed chamber 615 of the actuating member 601 and may include a seal 623, as shown, to provide sealing contact between the closed valve port 423 and the closed chamber 615. Pressurized fluid is then provided from the closed chamber 615 to the IBOP or IBOP actuator 701 thru a closed valve port 517 in the rotatable member 501. The closed valve port 517 may be connected to the IBOP or IBOP actuator 701 by a seal sub 519. The seal sub 519 may include seals 521, as shown, to provide sealing contact between the closed valve port 517 of the rotatable member 501 and the IBOP or IBOP actuator 701. With this arrangement, when the actuating member 601 is in the engaged position, as shown in FIG. 8, pressurized fluid may be supplied to the closed valve inlet 421 of the non-rotatable member 401 of the fluid union to provide pressurized fluid through a sealed passage to the IBOP or IBOP actuator 701. This sealed passage, for example, may then be used by the IBOP or IBOP actuator to close the IBOP and stop fluid flow through the IBOP.

Figure 9:
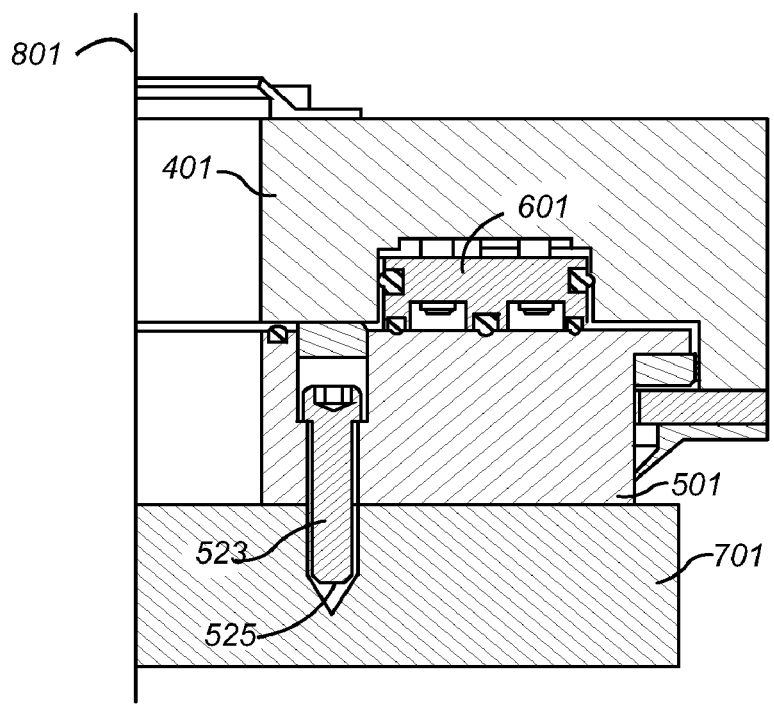
FIG. 9 shows a cross-section taken along line E-E of the fluid union shown in FIGS. 3A and 3B in accordance with an embodiment of the present invention.

Referring to FIG. 9, a cross-section taken along line E-E of the fluid union in FIGS. 3A and 3B is shown. The rotatable member 501 may further include mounting bolts 523 to secure the rotatable member 501 to the IBOP or IBOP actuator 701. The mounting bolts 523 may threadedly engage with recesses 525 of the rotatable member 501 when securing the rotatable member 501 and the IBOP or IBOP actuator 701 together. Those having ordinary skill in the art will appreciate that other securing mechanisms, such as welding, may be used to secure the rotatable member with the IBOP or IBOP actuator without departing from the scope of the present invention.

In one embodiment following a method in accordance with the present invention, pressurized fluid (the power source) may be first supplied to an activation inlet of a non-rotatable member to activate a fluid union. The pressure of the pressurized fluid should be high enough to overcome a force from a spring (the biasing mechanism) disposed within a piston (the actuating member). This will allow the pressurized fluid to push the piston along the axis from the non-engaged position into the engaged position. In the engaged position, the piston is enabled to allow sealed flow through the open chamber and closed chamber. The pressurized fluid may then be continuously supplied to the activation inlet throughout the fluid union's use to enable sealed flow through the open and closed chambers. Next, pressurized fluid is also supplied to either one of an open valve inlet or a close valve inlet. If an IBOP needs to be opened, pressurized fluid may be supplied to the open valve inlet. If the IBOP needs to be closed, pressurized fluid may be supplied to the close valve inlet. Pressurized fluid supplied to the open valve inlet flows through a sealed passage comprised of the port in the non-rotatable member, a chamber within the piston, and a port in the rotatable member to be supplied to the attached IBOP or IBOP actuator. Similarly, pressurized fluid supplied to the close valve inlet flows through a sealed passage comprised of a port in the non-rotatable member, the chamber within the piston, and the port in the rotatable member to be supplied to the attached IBOP or IBOP actuator. Pressurized fluid may then be supplied to each of the valve inlets as necessary to open and close the IBOP as necessary. Following this, after pressurized fluid is no longer supplied to the valve inlets, pressurized fluid may stop being supplied to the to the activation inlet. This will allow the piston to move back along the axis from the engaged position to the non-engaged position from the force of biasing mechanisms.

Preferably, when activating the fluid union, the non-rotatable member and rotatable member are rotationally stationary with respect to one another. In one embodiment, a locking device may be used to prevent activation of the actuating member when the IBOP and/or rotatable member is rotating with respect to the non-rotating member. This would allow the actuating member to move into the engaged position only when the IBOP and/or rotatable member is stationary. This will help preserve the life of the seals on the actuating member. However, if the rotatable member is rotating with respect to the non-rotatable member, the seals will be able to provide sealing contact between the actuating member and the rotatable member when the actuating member is in the engaged position.

With the open and close valve inlets, two different sealed passageways may be used to provide fluid to the IBOP or IBOP actuator. The pressurized fluid then, as described above, may be used to subsequently open and close the IBOP to control the fluid flow through the IBOP as necessary. Those having ordinary skill in the art will appreciate that the present invention, though, is not limited to this arrangement for the fluid union. In another embodiment, instead of having two valve inlets, only one valve inlet may be used. For example, if an IBOP actuator only requires one passageway of pressurized fluid to open and close an IBOP, the present invention may be use only one valve inlet and one sealed passageway through the fluid union to supply fluid to the IBOP or IBOP actuator. Further, in another embodiment, the present invention may have more than two valve inlets and two sealed passageways. At least one additional valve inlet and sealed passageway, if not more, may be incorporated into the fluid union without departing from the scope of the present invention. Thus, the present invention is not limited to a number of sealed passageways and valve inlets therein.

Further, those having ordinary skill in the art will appreciate that the valve inlets within the non-rotatable member of the fluid union may also be used to activate the actuating member. For example, in one embodiment, pressurized fluid may be supplied to the valve inlets to activate the actuating member, moving the actuating member along the axis from the non-engaged position into the engaged position. In the engaged position, the actuating member then creates the sealed passageways to supply fluid through the fluid union to the IBOP or IBOP actuator. If necessary, a locking device may then be used to hold the actuating member into the engaged position. Then, after the pressurized fluid reached a specific amount of pressure, a switch, for example, may be actuated by the specific pressure of the pressurized fluid to allow the pressurized fluid to now instead flow through the sealed passageways of the fluid union to open and close the secured IBOP or IBOP actuator. Alternatively, instead of the switch being actuated by the pressurized fluid, the switch may be actuated by a timing mechanism that controls the flow of the pressurized fluid between activating the actuating member and actuating the attached IBOP or IBOP actuator. Regardless of the specific embodiment, the valve inlets may be used as the power source to activate the actuating member in step 1020 and as the pressurized fluid to open and close the secured IBOP or IBOP actuator in step 1040 in the method of actuating an IBOP shown in the flow chart of FIG. 10.

Embodiments of the present invention may have one or more of the following advantages. As discussed above, embodiments of the present invention include spilt fluid unions. With a split fluid union, internal seals would be more readily accessible to perform maintenance as necessary. Instead of having to disassemble parts of the drill string to be able to slide prior art fluid unions off for maintenance, for example, the split fluid union of the present invention may be disassembled more easily by only removing the securing pins holding the split fluid union together. This saves significant amounts of time for maintenance, time which is very expensive and valuable in the oilfield industry.

Further, prior art fluid unions require frequent maintenance to replace seals between the members of the fluid union. However, embodiments of the fluid union of the present invention are able to avoid maintaining constant contact of the seals between the two members of the fluid union. The actuating member is only activated when necessary to provide a sealed passageway between the members of the fluid union. This allows the seals to have a longer service life, reducing the amount of maintenance the fluid unions require.

Further, embodiments of the present invention are not limited for use with an IBOP or IBOP actuator commonly found in the oilfield industry. The present invention may be used in any application that requires fluid or fluids be supplied from a stationary environment to a rotating environment, such as a rotating shaft. The fluid union is well adapted to be used in harsh environments, such as marine, lumber, petrochemical, or off-road/construction vehicle applications, and may be operated while stationary or rotating.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A fluid union comprising:
   a rotatable member having an axis about which the rotatable member rotates;
   a non-rotatable member; and
   an actuating member disposed between the rotatable member and the non-rotatable member;
   wherein the actuating member is moveable along a line between an engaged position and a non-engaged position, the line being parallel to the axis about which the rotatable member rotates;
   wherein the actuating member is biased towards the non-rotatable member;
   wherein the actuating member comprises sealing elements disposed to face the rotatable member;
   wherein the non-rotatable member comprises an inlet configured to receive a fluid under pressure, the inlet being configured to communicate with a recess in the actuating member and being configured to lead the fluid under pressure to the actuating member;
   wherein the rotatable member and the actuating member form together two enclosures at an interface between the rotatable member and the actuating member; and
   wherein the sealing elements press on the rotatable member such that the two enclosures are formed by the actuating member, the sealing elements and the rotatable member when the fluid under pressure actuates the actuating member.

2. The fluid union of claim 1, wherein upon supply of a power source to the non-rotatable member, the actuating member is configured to move into the engaged position such that a sealed passageway is provided between the rotatable member and the non-rotatable member.

3. The fluid union of claim 2, wherein the power source is one of hydraulic power, pneumatic power, and electrical power.

4. The fluid union of claim 1, wherein the non-rotatable member further comprises an activation inlet, wherein upon supply of pressurized fluid to the activation inlet, the actuating member is configured to move into an engaged position such that a sealed passageway is provided between the rotatable member and the non-rotatable member.

5. The fluid union of claim 1, wherein the actuating member is a piston.

6. The fluid union of claim 1, wherein the non-rotatable member has at least one valve inlet.

7. The fluid union of claim 1, wherein the rotatable member and the non-rotatable member are each split into at least two pieces.

8. The fluid union of claim 1, wherein the rotatable member and the non-rotatable member are rotatably secured.

9. The fluid union of claim 1, further comprising radial bearings disposed on one of the rotatable member and the non-rotatable member.

10. The fluid union of claim 1, further comprising axial thrust bearings disposed on one of the rotatable member and the non-rotatable member.

11. The fluid union of claim 1, wherein the fluid union is configured to be secured to an internal blowout preventer actuation device.

12. The fluid union of claim 1, wherein the actuating member is able to rotate with the rotatable member when the actuating member is in the engaged position.

13. A fluid union comprising:
- a rotatable member having an axis about which the rotatable member rotates;
- a non-rotatable member comprising an activation inlet and at least one valve inlet; and
- a piston comprised of metal and disposed between the rotatable member and the non-rotatable member;
- wherein the piston is moveable along a line between an engaged position and a non-engaged position, the line being parallel to the axis about which the rotatable member rotates;
- wherein the piston is biased towards the non-rotatable member;
- wherein the piston comprises sealing elements disposed to face the rotatable member;
- wherein the activation inlet is configured to receive a fluid under pressure, the activation inlet being configured to communicate with a recess of the piston and being configured to lead the fluid under pressure to the piston;
- wherein the rotatable member and the piston form together two enclosures at an interface between the rotatable member and the piston; and
- wherein the sealing elements press on the rotatable member such that the two enclosures are formed by the piston, the sealing elements and the rotatable member when the fluid under pressure actuates the piston.

14. A fluid union device comprising:
- a rotatable member having an axis about which the rotatable member rotates;
- a non-rotatable member;
- an actuating member disposed between the rotatable member and the non-rotatable member, wherein the actuating member is moveable along a line between an engaged position and a non-engaged position, the line being parallel to the axis about which the rotatable member rotates; and
- a biasing member provided in a recess of the actuating member and configured to bias the actuating member towards the non-rotatable member,
- wherein the rotatable member and the actuating member form together two enclosures at an interface between the rotatable member and the actuating member;
- wherein the actuating member comprises sealing elements disposed to face the rotatable member;
- wherein the non-rotatable member comprises an inlet configured to receive a fluid under pressure, the inlet being configured to communicate with the recess of the actuating member and being configured to lead the fluid under pressure to the actuating member; and
- wherein the sealing elements press on the rotatable member such that the two enclosures are formed by the actuating member, the sealing elements and the rotatable member when the fluid under pressure actuates the actuating member.

15. The fluid union of claim 14, wherein the non-rotating member has a recess and the actuating member is disposed inside the recess of the non-rotating member.

16. The fluid union of claim 14, wherein the two enclosures are sealed when the actuating member is in the engaged position and the sealing elements do not contact the rotating member when the actuating member is in the non-engaged position.

* * * * *